(12) United States Patent
Wu et al.

(10) Patent No.: US 7,077,998 B2
(45) Date of Patent: Jul. 18, 2006

(54) CATALYTIC CRACKING REACTION-REGENERATION SYSTEM

(76) Inventors: Xuefeng Wu, 18 Xueyuan Road, Haidian District, Beijing 100083 (CN); Jun He, 18 Xueyuan Road, Haidian District, Beijing 100083 (CN); Zhanfeng Zhang, 18 Xueyuan Road, Haidian District, Beijing 100083 (CN); Xianglin Yu, 18 Xueyuan Road, Haidian District, Beijing 100083 (CN); Xiaoxiang Zhong, 18 Xueyuan Road, Haidian District, Beijing 100083 (CN)

( * ) Notice: Subject to any disclaimer, the term of this patent is extended or adjusted under 35 U.S.C. 154(b) by 678 days.

(21) Appl. No.: 10/304,748

(22) Filed: Nov. 27, 2002

(65) Prior Publication Data

US 2003/0124034 A1    Jul. 3, 2003

(30) Foreign Application Priority Data

Nov. 29, 2001   (CN)   ................................. 01 1 40184

(51) Int. Cl.
*B01J 8/12* (2006.01)
*B01J 8/26* (2006.01)
*B01J 8/36* (2006.01)

(52) U.S. Cl. ...................... 422/144; 422/139; 422/141; 422/145; 422/147; 422/188; 208/113

(58) Field of Classification Search ................. 422/144
See application file for complete search history.

(56) References Cited

U.S. PATENT DOCUMENTS

| 4,026,789 | A | * | 5/1977 | James | 208/74 |
| 4,419,221 | A | * | 12/1983 | Castagnos et al. | 208/113 |
| 5,449,496 | A | * | 9/1995 | Pontier et al. | 422/144 |
| 6,069,012 | A | | 5/2000 | Kayser | 436/37 |

* cited by examiner

*Primary Examiner*—Hien Tran
*Assistant Examiner*—Jennifer A. Leung
(74) *Attorney, Agent, or Firm*—Scully, Scott, Murphy & Presser, P.C.

(57) ABSTRACT

A catalytic cracking reaction-regeneration system, comprising a regenerator, a settler, a gas-solid separator, a buffer, a riser reactor, a horizontal reaction tube, a catalyst delivery pipe, and a down-flow reactor. This system can be used for experiments and researches on various processes such as riser catalytic cracking, sectional feeding, instantaneous contact, and down-flow catalytic cracking and can be used for catalyst evaluation tests. This abstract is neither intended to define the invention disclosed in this specification nor intended to limit the scope of the invention in any way.

9 Claims, 1 Drawing Sheet

CATALYTIC CRACKING REACTION-REGENERATION SYSTEM

BACKGROUND OF THE INVENTION

1. Field of the Invention

The present invention relates to catalytic cracking apparatus of petroleum hydrocarbons in the absence of hydrogen and, more particularly, to a catalytic cracking reaction-regeneration system for the application in laboratories.

2. Description of Background and Related Art

Catalytic cracking is an important refining process for producing motor fuel oils and chemical feedstocks and is an effective means for lightening heavy oils. Therefore, catalytic cracking process has been a researching point of studies in the refinery industry for decades. As known to all, the development of a novel process and catalyst must under go a rather long investigation course from bench-scale exploration, via pilot plant, to industrial application. Therefore, whether the data in laboratories are prospective, in other words, whether said data are able to reflect the anticipated results of the industrial application is a key to the success of the technical development. There are two ways for researching catalytic cracking processes in laboratories: one is to use a fixed fluidized-bed unit, and the other is to use a continuous reaction-regeneration fluidized-bed unit or a riser unit. The fixed fluidized-bed unit is small in scale, convenient, flexible, cheap, and with the use of a small amount of oil and catalyst; so, it is widely adopted by many research institutes and refineries mainly for evaluating catalysts. Small or medium units for continuous reaction-regeneration unit can better simulate the conditions in an industry-scale unit and match the industrial data in the yield and the quality of the resultant products.

There are not many reference documents in the prior art concerning laboratory catalytic cracking units. The relevant information can be referred to U.S. Pat. No. 6,069,012 and the circulating riser catalytic cracking experimental unit of GRACE DAVISON CORPORATION. However, the function of these units is rather simple and cannot meet the needs of the evaluation of various novel catalysts and the development of the processing.

U.S. Pat. No. 6,069,012 discloses an improved fixed fluidized-bed reactor. The improvement in the structure of this reactor is embodied in the following two aspects: (1) adoption of a height-variable feeding sleeving, the inner tube of which is used to deliver oil feedstocks, while the jacket is used to deliver the fluidizing gas; and (2) a fluidizing gas nozzle is additionally equipped at the center of the bottom of the reactor. The above improvements in the structure enable the fixed fluidized-bed reactor to adjust the reaction time by modifying the height of the feeding nozzle. Besides, the addition of the fluidizing gas nozzle at the bottom of the reactor can improve the fluidized state of the catalyst; however when the linear speed of the reactor bed is equal to or greater than 18.2 cm/sec, a violent turbulent flow and slugging may happen to the catalyst bed, the catalyst may be elevated to the top of the reactor and deviated from the isothermal section of the reactor, which leads to ineffective control of the reaction temperature. Because of the limitation of the above bed linear speed, such a reactor can only be experimented under ordinary catalytic cracking reaction conditions, but is not suitable for the special reaction requirements of the present catalytic cracking field for carrying out reaction under high temperature, high catalyst/oil ratios, high gas outputs, and so on.

One of the most important process parameters of fluidized catalytic cracking is the contact time of hydrocarbons and the catalyst. Recent studies show that 90% of the feedstock conversion takes place during a very short time of the feedstock contacting with the catalyst. Based on this knowledge, the structure of existing units is gradually reformed to raise the yield and quality of the product. However, a shorter feedstock-oil contact time needs the match of a higher catalyst/oil ratio to achieve a desirable conversion depth of hydrocarbons and oil. Therefore, either the design of a new unit, or the reformation of an old unit should meet the requirement in this respect.

In a continuous reaction-regeneration system, the shortening of the reaction time can be realized by using a down-flow reactor or instantaneous reaction structure with ultrashort time. In addition to a short oil/catalyst contact time, down-flow reactor can greatly reduce backmixing and thereby reduce the secondary reactions which are unfavorable to the product distribution. The instantaneous reaction structure can examine the positive influence of the ultrashort reaction time on the distribution and quality of the product.

As for the present continuous reaction-regeneration experimental units for catalytic cracking both at home and abroad, no reports have been found relating to the integration of riser, down-flow operation, and instantaneous reaction structure which results in flexible switch their-between.

SUMMARY OF THE INVENTION

The object of the present invention is to provide a novel laboratory-scale catalytic cracking unit, which can not only be used for evaluating catalyst performance, but also meet the requirement for research on a variety of catalytic cracking processes.

a catalytic cracking reaction-regeneration system, characterized in that said system comprises:

a regenerator 1 used for regenerating the coke-deposited spent catalyst, a flue gas pipe being equipped at the top of said regenerator, and a regeneration air pipe and a regeneration catalyst delivery pipe 2 being equipped at the bottom;

a settler 15, its upper section being used for the convergence and disengagement of the reaction oil-gas, the lower section being used for stripping the coke-deposited catalyst, the top of the settler being equipped with an oil-gas pipe which is connected to a separation system, and the bottom of said settler being connected with regenerator 1 via a spent catalyst delivery pipe 18;

a gas-solid separator 14 used for separating the reaction oil-gas and the catalyst, the top of said gas-solid separator being connected with the upper section of settler 15 via a pipeline, and the bottom of said separator being connected with the lower section of settler 15;

a buffer 9 used for storing the catalyst when the system carries out down-flow reaction;

a riser reactor 5 used to carry out riser catalytic cracking reaction, the lower section of said riser reactor being connected with regenerator 1 via regenerated catalyst delivery pipe 2;

a horizontal reaction pipe 13 used to carry out instantaneous contact catalytic cracking reaction, one section of said horizontal reaction pipe being vertically connected with the outlet of the upper section of riser reactor 5 via valve A, while the other section being connected with the inlet of gas-solid separator 14;

a catalyst delivery pipe 8 connecting the riser reactor with the buffer tank, said delivery pipe is coaxial with riser reactor 5, locates above it, and is used for delivering the catalyst from riser 5 and the elevating medium, then introducing them into buffer tank 9, valve C being equipped between catalyst delivery pipe 8 and riser reactor 5; and a down-flow reactor 12 used for carrying out down-flow catalytic cracking reaction, the upper section of said down-flow reactor being connected with the buffer tank, and the lower section being connected with a horizontal reaction pipe 13 via valve B or being connected with settler 15.

Compared to the prior art, the useful effects of the present invention are mainly embodied in the following aspects:

The catalytic cracking-regeneration system of the present invention integrates the structural features of riser, down-flow reaction and instantaneous reaction, and can meet the needs of the experiments and researches on a variety of processes and create convenient conditions for studies and development of the catalytic cracking process.

The catalytic cracking-regeneration system of the present invention can be used for the catalytic cracking experiment on different oil feedstocks and catalysts, and thereby can yield representative experimental data. These experimental results can provide both basis for the design of industrial units and data for the development of the mathematic model of catalytic cracking.

The present application claims priority under 35 U.S.C. §119 of Chinese Patent Application No. 01140184.2 filed on Nov. 29, 2001. The disclosure of the foregoing application is expressly incorporated by reference herein in its entirety.

DETAILED DESCRIPTION OF THE INVENTION

Figure 1:
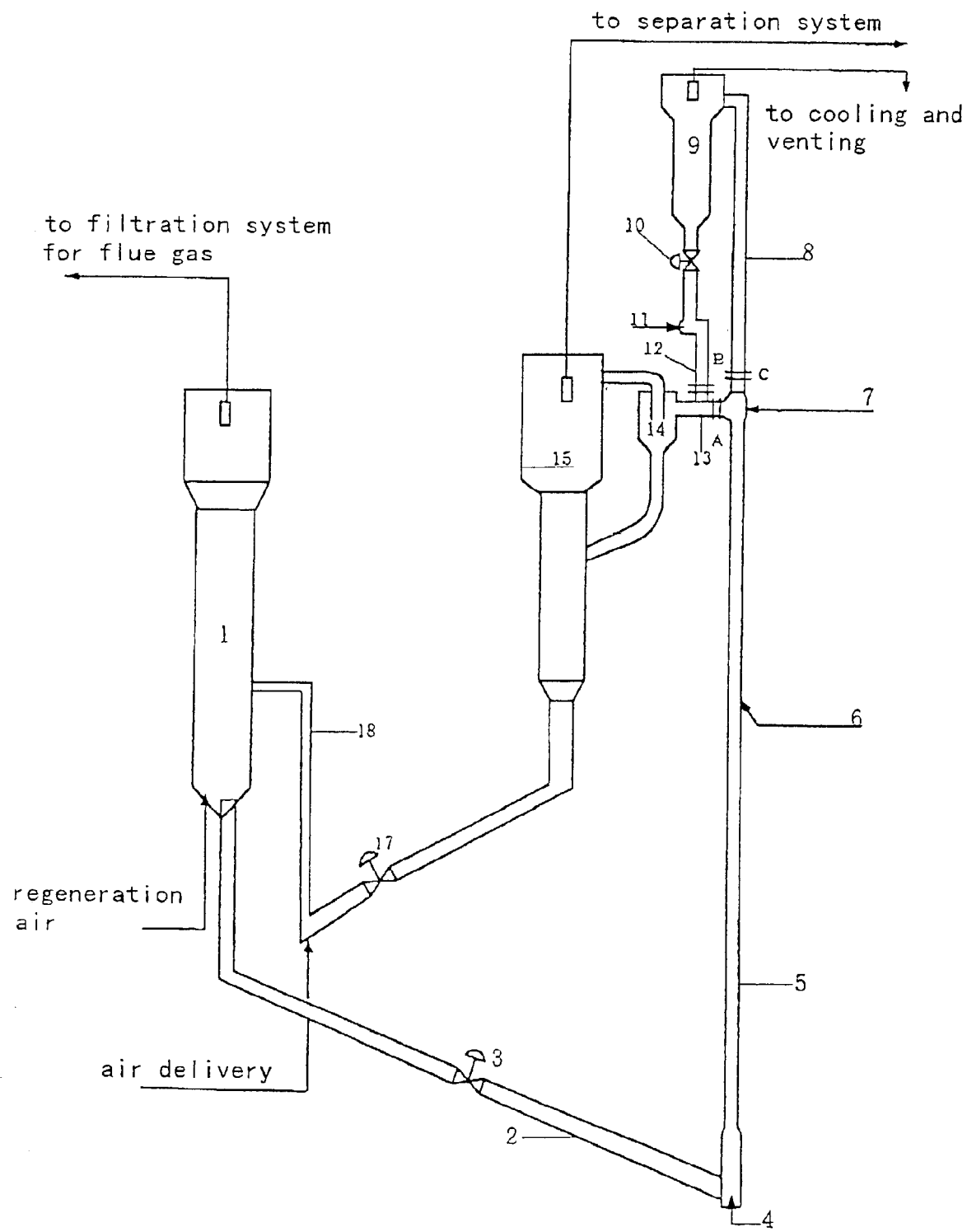
FIG. 1 is the principle flowchart of the catalytic cracking reaction regeneration system of the present invention.

In the catalytic cracking-regeneration system according to the present invention, the top of regenerator 1 is equipped with a flue gas pipe and the bottom of it is equipped with a regeneration air pipe and a regeneration catalyst delivery pipe 2 installed with regeneration slide valve 3. Settler 15 is used for the convergence and disengagement of the reaction oil-gas, the lower part of which being used for stripping the coke-deposited spent catalyst. The top of said settler is equipped with an oil-gas pipe connected to the separation system, while the bottom of it is connected with regenerator 1 via spent catalyst delivery line 18 having a regeneration slide valve 17. Buffer tank 9 is used for storing the catalyst in the down-flow reaction of the system. At the top of said buffer tank, a venting pipe is set; and at its bottom, there is buffer slide valve 10. Catalyst delivery pipe 8, connecting the riser reactor with the buffer tank, is coaxial with riser reactor 5 and located above said reactor, for delivering the catalyst from riser 5 and the elevating medium and then introducing said materials into buffer tank 9. Valve C is set between catalyst delivery pipe 8 and riser reactor 5. Down-flow reactor 12 is used for carrying out down-flow catalytic cracking reaction, the upper section of reactor 12 is connected to buffer slide valve 10 while the lower section of it is connected to horizontal reaction pipe 13 or to the settler via valve B. The down-flow reactor should be in such a way that the catalyst in the buffer tank enters into the down-flow reactor via the buffer slide valve and under the action of gravity.

In the catalytic cracking-regeneration system according to the present invention, said gas-solid separator is selected from cyclone separator, filtration tube, filter screen and other means suitable for separating hydrocarbon gases and the catalyst, with cyclone separator or filtration tube being preferred.

In the catalytic cracking-regeneration system according to the present invention, the internal part of the down-flow reactor 12 can be equipped with various types of baffles or packing for improving the contact condition of the petroleum hydrocarbon and the catalyst in the down-flow reactor and for effectively controlling the contact time of the two.

In the catalytic cracking reaction regeneration system of the present invention, gas-solid separator 14 may locate either outside or inside of settler 15. Said valves A, B and C are any one selected from the member consisting of baffle, manual ball valve, pneumatic ball valve, or plugging screw, and baffle is preferred.

In the catalytic cracking reaction-regeneration system of the present invention, the upper section and the lower section of riser reactor 5 are equipped with feeding nozzles 7 and 4 respectively, while feeding nozzle 6 is installed between nozzles 7 and 4. The relative positions of above nozzles can be adjusted according to the requirement of the experiment. The upper section of said down-flow reactor 12 is equipped with feeding nozzle 11 which can either be vertical to the down-flow reactor or situated in other angles.

The present invention has no special requirement for the relative position between the regenerator and the settler, and the former can locate either above or below the latter. The outlet, of the spent catalyst delivery pipe connected with the settler and the regenerator which locates at one side of the regenerator, can be equipped either above or below the catalyst dense phase bed of the regenerator.

The operation way of the catalytic cracking reaction-regeneration system of the present invention will be further illustrated in combination with the FIGURE, but is not limited here to.

1. Carrying out riser catalytic cracking reaction by closing valves B and C and opening valve A.

As shown in FIG. 1, the oil feedstock enters riser reactor 5 via nozzle 4, uniformly mixes at the inlet of the riser reactor with the regenerated catalyst from regenerated catalyst delivery pipe 2, rapidly evaporates and reacts. The mixture of oil-gas and the catalyst ascends along the riser and enters gas-solid separator 14 via horizontal reaction pipe 13. Under the action of the gas-solid separator, oil-gas is rapidly separated from the catalyst to reduce the secondary cracking reaction of the products. The spent catalyst falls down to the stripping section at the lower part of settler 15 via the dipleg, and the reaction oil-gas enters the top of the settler via the uptake, after filtering off fine powders, leaves the top, and enters the subsequent separation system.

The spent catalyst in stripping section of the settler is stripped. The stripped catalyst is fed to regenerator 1 via spent catalyst delivery pipe 18 equipped with spent catalyst slide valve 17. The spent catalyst is regenerated by burning off coke in the regenerator and the regenerated catalyst is fed to the riser reactor via regenerated catalyst delivery pipe 2 equipped with regenerated catalyst slide valve 3 for recycling use. The regenerated flue gas leaves the top of the regenerator after filtration.

2. Carrying out sectionally feeding experiment in the riser by closing valves B and C and opening valve A.

As shown in FIG. 1, a part of the oil feedstock enters riser 5 via nozzle 4, uniformly mixes at the inlet of the riser reactor with the regenerated catalyst from the regenerated catalyst delivery pipe 2, rapidly evaporates and reacts; meanwhile, the remaining part of the oil feedstock enters the riser via nozzle 6, and contacts and reacts with the catalyst and oil-gas flowing upwards from the bottom of the riser. The mixture of the reaction oil-gas and the catalyst enters gas-solid separator 14 via horizontal reaction pipe 13. The spent catalyst falls down to the stripping section at the lower part of settler 15 via the dipleg, and the reaction oil-gas enters the top of the settler via the uptake, then leaves the top after filtering off fine powders, and enters the subsequent separation system.

The spent catalyst in stripping section of the settler is stripped. The stripped catalyst is fed to regenerator 1 via spent catalyst delivery pipe 18 equipped with spent catalyst slide valve 17. The spent catalyst is regenerated by burning off coke in the regenerator and the regenerated catalyst is fed to the riser reactor via regenerated catalyst delivery pipe 2 equipped with regenerated catalyst slide valve 3 for recycling use. The regenerated flue gas leaves the top of the regenerator after filtration.

3. Carrying out catalytic cracking reaction having instantaneous contact by closing valves B and C and opening valve A.

As shown in FIG. 1, an inert gas is introduced into riser 5 via nozzle 4 and used for elevating the regenerated catalyst from the regenerated catalyst delivery pipe to the top of the riser. The oil feedstock is fed to the joint of riser 5 and horizontal reaction pipe 13 via nozzle 7, then contacts and reacts with the regenerated catalyst. The mixture of oil and catalyst enters horizontal reaction pipe 13 and reacts therein. The reaction oil-gas and catalyst enter the gas-solid separator 14. Under the action of the gas-solid separator, oil-gas is rapidly separated from the catalyst to reduce the secondary cracking reaction of the products. The spent catalyst falls down to the stripping section at the lower part of settler 15 via the dipleg, and the reaction oil-gas enters the top of the settler via the uptake, then leaves the top after filtering off fine powders, and enters the subsequent separation system.

The spent catalyst in the stripping section of the settler is stripped. The stripped catalyst is fed to regenerator 1 via spent catalyst delivery pipe 18 equipped with spent catalyst slide valve 17. The spent catalyst is regenerated by burning off coke in the regenerator and the regenerated catalyst is fed to the riser reactor via regenerated catalyst delivery pipe 2 equipped with regenerated catalyst slide valve 3 for recycling use. The regenerated flue gas leaves the top of the regenerator after filtration.

4. Carrying out down-flow catalytic cracking reaction by closing valve A and opening valves B and C.

As shown in FIG. 1, the regenerated catalyst from regenerated catalyst delivery pipe 2 is delivered into buffer tank 9 via riser 5 and delivery pipe 8 by elevation of an inert gas such as steam, nitrogen, etc. After stripping with steam, the catalyst enters the down-flow reaction tube via slide valve 10, mixes with the oil feedstock fed from nozzle 11, flows downwards, and reacts. The reaction oil-gas and catalyst enter gas-solid separator 14. The gas at the top of buffer tank 9 is purged to vent via the controlling valve at the top. Under the action of the gas-solid separator, oil-gas is rapidly separated from the catalyst to reduce the secondary cracking reaction of the products. The spent catalyst falls down to the stripping section at the lower part of settler 15 via the dipleg, while the reaction oil-gas enters the top of the settler via the uptake, then leaves the top after filtering off fine powders, and enters the subsequent separation system.

The spent catalyst in the stripping section of the settler is stripped. The stripped catalyst is fed to regenerator 1 via spent catalyst delivery pipe 18 equipped with spent catalyst slide valve 17. The spent catalyst is regenerated by burning off coke in the regenerator, and the regenerated catalyst is fed to the riser reactor via regenerated catalyst delivery pipe 2 equipped with regenerated catalyst slide valve 3 for recycling use. The regenerated flue gas leaves the top of the regenerator after filtration.

The above-mentioned four modes of operation are illustrative according to the present invention. Other ways of catalytic cracking reaction can also be performed by simply modifying the structure of the system of the present invention, for example, catalytic cracking reaction conducted in double risers can be carried out by incorporating an additional riser. Similar changes will be understood by persons skilled in the art, though such changes or modifications have not listed herein.

The following examples will further illustrate but is not intended to limit the catalytic cracking reaction-regeneration system of the present invention. The oil feedstock used in the experiments is an atmospheric residue from Daqing and the catalyst used is produced by the Catalyst Plant of Qilu Petrochemical Co. with a trademark of MLC-500. The properties of the oil feedstock and the catalyst can be referred to in Tables 1 and 2 respectively.

EXAMPLE 1

The present example shows the instance when the experimental unit of the present invention was used to conduct riser catalytic cracking.

The steps of the experiment as follows: valves B and C were closed but valve A was open. As shown in FIG. 1, the oil feedstock entered the riser reactor 5 via nozzle 4, uniformly mixed at the inlet of the riser reactor with the regenerated catalyst from regenerated catalyst delivery pipe 2, rapidly evaporated and reacted. The mixture of oil-gas and the catalyst ascended along the riser and entered cyclone separator 14 via horizontal reaction pipe 13. Under the action of the cyclone separator, oil-gas was rapidly separated from the catalyst to reduce the secondary cracking reaction of the products. The spent catalyst fell down to the stripping section at the lower part of settler 15 via the dipleg, and the reaction oil-gas entered the top of the settler via the uptake, then left the top and entered the subsequent separation system after filtering off fine powders.

The spent catalyst in the stripping section of the settler was stripped. The stripped catalyst was fed to regenerator 1 via spent catalyst delivery pipe 18 equipped with spent catalyst slide valve 17. The spent catalyst was regenerated by burning off coke in the regenerator, and the regenerated catalyst was fed to the riser reactor via regenerated catalyst delivery pipe 2 equipped with regenerated catalyst slide valve 3 for recycling use. The regenerated flue gas left the top of the regenerator after filtration.

The major operation conditions and product distribution are shown in Table 3.

EXAMPLE 2

This example shows the instance when the experimental unit of the present invention was used to conduct sectionally feeding experiment in the riser reactor.

The steps of the experiment were as follows: valves B and C were closed but valve A was open. As shown in FIG. 1, 50% by weight of the oil feedstock entered riser 5 via nozzle 4, uniformly mixed at the inlet of the riser reactor with regenerated catalyst from regenerated catalyst delivery pipe 2, rapidly evaporated and reacted, meanwhile, the remaining part of the oil feedstock entered the riser via nozzle 6, contacted and reacted with the catalyst and the oil-gas flowing upwards from the bottom of the riser. The mixture of the reaction oil-gas and catalyst entered cyclone separator 14 via horizontal reaction pipe 13. The spent catalyst fell down to the stripping section at the lower part of settler 15 via the dipleg, and the reaction oil-gas entered the top of the settler via the uptake, left the top and entered the subsequent separation system after filtering off fine powders.

The spent catalyst in the stripping section of the settler is stripped. The stripped catalyst was fed to regenerator 1 via spent catalyst delivery pipe 18 equipped with spent catalyst slide valve 17. The spent catalyst was regenerated by burning off coke in the regenerator, and the regenerated catalyst was fed to the riser reactor via regenerated catalyst delivery pipe 2 equipped with regenerated catalyst slide valve 3 for recycling use. The regenerated flue gas left the top of the regenerator after filtration.

The major operation conditions and product distribution are shown in Table 4.

EXAMPLE 3

This example shows the instance when the experimental unit of the present invention was used to conduct down-flow catalytic cracking.

The steps of the experiment were as follows: valve A was closed but valves B and C were open. As shown in FIG. 1, by means of elevation of an inert gas such as steam, nitrogen, and so on, the regenerated catalyst from regenerated catalyst delivery pipe 2 was delivered into buffer tank 9 via riser 5 and delivery pipe 8. After stripping with steam, the catalyst entered the down-flow reaction tube via slide valve 10, mixed with the oil feedstock fed from nozzle 1, flew downwards, and reacted. The reaction oil-gas and catalyst entered cyclone separator 14. The gas at the top of buffer tank 9 was purged via the controlling valve at the top of the buffer tank. Under the action of the cyclone separator, oil-gas was rapidly separated from the catalyst to reduce the secondary cracking reaction of the products. The spent catalyst fell down to the stripping section at the lower part of settler 15 via the dipleg, while the reaction oil-gas entered the top of the settler via the uptake, then left the top and entered the subsequent separation system after filtering off fine powders.

The spent catalyst in the stripping section of the settler was stripped. The stripped catalyst was fed to regenerator 1 via spent catalyst delivery pipe 18 equipped with spent catalyst slide valve 17. The spent catalyst was regenerated by burning off coke in the regenerator, and the regenerated catalyst was fed to the riser reactor via regenerated catalyst delivery pipe 2 equipped with regenerated catalyst slide valve 3 for recycling use. The regenerated flue gas left the top of the regenerator after filtration.

The major operation conditions and product distribution are shown in Table 5.

TABLE 1

| | |
|---|---|
| Density (20° C.), g/cm$^3$ | 0.8971 |
| Viscosity (100° C.), mm$^2$/s | 30.5 |
| Carbon residue, wt % | 5.5 |
| Solidification point, ° C. | 33 |
| Elementary analysis, wt. % | |
| C | 86.66 |
| H | 12.74 |
| S | 0.16 |
| N | 0.28 |

TABLE 1-continued

| | |
|---|---|
| Content of metals, ppm | |
| Fe | 9.4 |
| Ni | 5.0 |
| Cu | 0.2 |
| V | 0.1 |
| Na | 1.4 |
| Distillation range, ° C. | |
| Initial | 273 |
| 5% | 354 |
| 10% | 386 |
| 30% | 463 |
| 45% | 523 |

TABLE 2

| | |
|---|---|
| Chemical composition, wt % | |
| Al$_2$O$_3$ | 46.5 |
| Na$_2$O | 0.22 |
| Fe$_2$O$_3$ | 0.34 |
| Screen composition, wt % | |
| 0–40 μm | 21.4 |
| 40–80 μm | 55.4 |
| >80 μm | 23.2 |
| Pore volume, ml/g | 0.30 |
| Specific surface area, m$^2$/g | 100 |
| Apparent bulk density, g/cm$^3$ | 0.7849 |
| Attrition index, m%h$^{-1}$ | 1.9 |
| Hydrothermal aging conditions | 800° C./100% steam/14 h |
| MAT (microactivity) | 65 |

TABLE 3

| | |
|---|---|
| Reaction temperature, ° C. | 508 |
| Catalyst/oil ratio | 5.7 |
| Feed flow, kg/h | 2.9 |
| Water injected into reactor, wt % of oil feedstock | 10 |
| Regeneration temperature, ° C. | 650 |
| Product distribution, wt. % | |
| Dry gas | 4.06 |
| LPG | 9.12 |
| Gasoline | 45.76 |
| Light cycle oil | 24.44 |
| Heavy cycle oil | 7.13 |
| Coke | 9.02 |
| Loss | 0.47 |

TABLE 4

| | |
|---|---|
| Reaction temperature, ° C. | 510 |
| Catalyst circulation rate, kg/h | 24 |
| Flow of feed No. 1, kg/h | 2.0 |
| Flow of feed No. 2, kg/h | 0.7 |
| Water injected into reactor, wt % of oil feedstock | 10 |
| Regeneration temperature, ° C. | 650 |
| Product distribution, wt. % | |
| Dry gas | 3.01 |
| LPG | 8.45 |
| Gasoline | 44.23 |
| Light cycle oil | 26.1 |
| Heavy cycle oil | 8.46 |
| Coke | 8.89 |
| Loss | 0.86 |

TABLE 5

| | |
|---|---|
| Reaction temperature, ° C. | 580 |
| Catalyst circulation rate, kg/hr | 24 |
| Flow of feed No. 4, kg/hr | 2.0 |
| Water injected into reactor, wt % of oil feedstock | 5 |
| Regeneration temperature, ° C. | 650 |
| Product distribution, wt. % | |
| Dry gas | 3.01 |
| LPG | 9.78 |
| Gasoline | 47.85 |
| Light cycle oil | 25.1 |
| Heavy cycle oil | 5.46 |
| Coke | 7.94 |
| Loss | 0.86 |

The invention claimed is:

1. A catalytic cracking reaction-regeneration system for conducting a catalytic cracking reaction on a hydrocarbon feed to produce a reaction oil-gas, said catalytic cracking reaction being carried out as a riser catalytic cracking reaction, an instantaneous contact catalytic reaction and/or a down-flow catalytic cracking reaction, said system comprising:

a regenerator used for regenerating a coke-deposited spent catalyst from the catalytic cracking reaction, said regenerator comprising a flue gas pipe being equipped at the top of said regenerator, a regeneration air pipe being equipped at the bottom of said regenerator, and a regenerated catalyst delivery pipe also being equipped at the bottom of said regenerator;

a settler having an upper section being used for the convergence and disengagement of the reaction oil-gas from the catalytic cracking reaction and a lower section being used for stripping the coke-deposited spent catalyst from the catalytic cracking reaction, the top of the settler being equipped with an oil-gas pipe which is connected to a separation system, and the bottom of said settler being connected with said regenerator via a spent catalyst delivery pipe;

a gas-solid separator used for separating the reaction oil-gas and the coke-deposited spent catalyst from the catalytic cracking reaction, the separator having an inlet for the reaction oil-gas and the coke-deposited spent catalyst, the top of said gas-solid separator being connected with the upper section of said settler via a pipeline, and the bottom of said separator being connected with the lower section of said settler via another pipeline;

a riser reactor used to carry out the catalytic cracking reaction as a riser catalytic cracking reaction, a lower section of said riser being connected with said regenerator via said regenerated catalyst delivery pipe and an upper section of said riser having an outlet for reaction oil-gas and coke-deposited spent catalyst;

a horizontal reaction pipe used to carry out the catalytic cracking reaction as an instantaneous contact catalytic cracking reaction, one end of said horizontal reaction pipe being connected with the outlet of the upper section of riser reactor via a first valve (A), while the other end of said horizontal reaction pipe is connected with the inlet of said gas-solid separator;

a buffer tank used for storing catalyst, said buffer tank also being connected to the outlet of the upper end of the riser reactor via a catalyst delivery pipe, said catalyst delivery pipe being coaxial with said riser reactor and located above said riser reactor; said catalyst delivery pipe being used for delivering catalyst from said riser reactor into said buffer tank by means of an elevating medium supplied to the riser reactor, a second valve (C) being equipped between said catalyst delivery pipe and said outlet of the upper section of said riser reactor; and a down-flow reactor used for carrying out the catalytic cracking reaction as a down-flow catalytic cracking reaction, the down-flow reactor having an upper section being connected with the buffer tank and a lower section being connected with said horizontal reaction pipe and said settler via a third valve (B).

2. The catalytic cracking reaction-regeneration system according to claim 1, characterized in that said gas-solid separator may be located either outside or inside said settler.

3. The catalytic cracking reaction-regeneration system according to claim 1, characterized in that said gas-solid separator is an installation selected from the group consisting of a cyclone separator, a filtration tube, a filter screen and other means suitable for separating the reaction oil-gas from the coke-deposited spent catalyst.

4. The catalytic cracking reaction-regeneration system according to claim 3, characterized in that said gas-solid separator is a cyclone separator or a filtration tube.

5. The catalytic cracking reaction-regeneration system according to claim 1, characterized in that each of said first valve (A), said third valve (B), and said second valve (C) is selected from the group consisting of a baffle, a manual ball valve, a pneumatic ball valve, and a plugging screw.

6. The catalytic cracking reaction-regeneration system according to claim 5, characterized in that each of said valves (A), (B), and (C) is a baffle.

7. The catalytic cracking reaction-regeneration system according to claim 1, characterized in that the upper section of said riser reactor is equipped with a first feeding nozzle, the lower section of said riser reactor is equipped with a second feeding nozzle, and a third feeding nozzle is installed between said first feeding nozzle and said second feeding nozzle.

8. The catalytic cracking reaction-regeneration system according to claim 1, characterized in that the upper section of said down-flow reactor is equipped with a feeding nozzle.

9. The catalytic cracking reaction-regeneration system according to claim 1, characterized in that the internal part of the down-flow reactor is equipped with baffles or packing for improving the contact between the hydrocarbon feed and the catalyst.

* * * * *